Dec. 24, 1957 L. SCHWARTZ 2,817,206
APPARATUS FOR MAKING COILS AND OTHER TWISTED AND MATED ELEMENTS
Filed Nov. 10, 1953 2 Sheets-Sheet 1

INVENTOR.
LAWRENCE SCHWARTZ
BY
HIS ATTORNEYS.

Dec. 24, 1957   L. SCHWARTZ   2,817,206
APPARATUS FOR MAKING COILS AND OTHER TWISTED AND MATED ELEMENTS
Filed Nov. 10, 1953   2 Sheets-Sheet 2

INVENTOR.
LAWRENCE SCHWARTZ
BY
HIS ATTORNEYS.

United States Patent Office 2,817,206
Patented Dec. 24, 1957

2,817,206

APPARATUS FOR MAKING COILS AND OTHER TWISTED AND MATED ELEMENTS

Lawrence Schwartz, Bronx, N. Y., assignor, by mesne assignments, to Cue Fastner, Inc., a corporation of New York Application November 10, 1953, Serial No. 391,357

11 Claims. (Cl. 57—1)

This invention relates to improvements in devices for twisting and mating filaments, yarns, wires, tapes and the like and it relates more particularly to an apparatus for winding the coils of spiral slide fasteners.

The devices used heretofore for mating yarns, wires, filaments and the like and for forming coils thereof for use in slide fasteners and the like may include a fixed mandrel around which the filaments are coiled or mated by means of moving elements which pass through suitable orbits, usually of a figure eight shape, around the mandrel and thereby lay the filaments in proper relation on the mandrel. The orbitally moving members usually include a support for a reel or a spool on which the yarn or filament is carried and travel along tracks or grooves around the mandrel. The carriages are of substantial size in order to support the spools and the mechanism for moving the several carriages in their orbital paths is relatively complicated and cumbersome. Due to the size of the elements and their orbital movements, the timing of the machine must be very accurate and moreover, it must be arranged so that there is no interference between the parts thereof. Due to the complexity of the prior devices, considerable power is required to drive them and moreover high operating forces are set up during the operation of the device. The forces and motions involved in the device are such that the speed of operation of the prior devices is definitely limited and the production rate is proportionately reduced.

Inasmuch as the spools or reels from which the filaments or the like are fed to the mandrel must be of reasonable size, the operation of the device can continue for only a relatively short period of time before the reels have to be replaced. The interruption of operation for replenishment of the machine, of course, reduces its production rate and, moreover, limits the length of the mated filaments or coils which may be produced on the machine.

The present invention relates to devices of the type generally discussed above which are constructed and arranged so that the moving parts of the device are relatively light in weight, are simple in structure and can be moved rapidly without setting up forces such as to render the operation of the device hazardous.

More particularly, the new device is characterized by a means for providing relative movement between the mandrel around which the filaments are coiled or mated and the feed devices for supplying the filaments to the mandrel so that the combined movements of these devices produce the necessary relative orbital or "figure 8" movement required for mating and/or coiling the filaments or yarns. The yarn or filament feeding devices are so arranged that they do not need to carry the yarn or filament supply and, in fact, the yarn and filament supplies may be independent of the machine so that an almost unlimited supply can be delivered to the feeding elements to enable almost continuous operation of the machine. The machine embodying the present invention is relatively less complex than any of the prior mating and coiling machines for the reason that the mandrel and the filament feed devices move in essentially straight lines in a reciprocating movement in timed relation thereby avoiding any possibility of setting up high centrifugal forces due to gyration or orbital movement of the elements and, moreover, permitting a much simple type of drive mechanism than that used heretofore in the mating and coiling machines. The simplification of the drive mechanism reduces the cost of manufacturing the machine and, moreover, it greatly facilitates maintenance and repair of the machines.

For a better understanding of the present invention, reference may be had to the accompanying drawing in which:

Figs. 2a to 10a show the various positions assummed by the filament guides and the mandrel in laying the filaments around the mandrel to form complemental coils.

The invention will be described with reference to the formation of two interlocking coils by means of two filaments or strands of a plastic or similar material to form the coil fastening elements of a pair of stringers for a slide fastener of a type shown in the Nicholas Wahl U. S. Patent No. 2,300,442, dated November 3, 1942.

Figure 1:
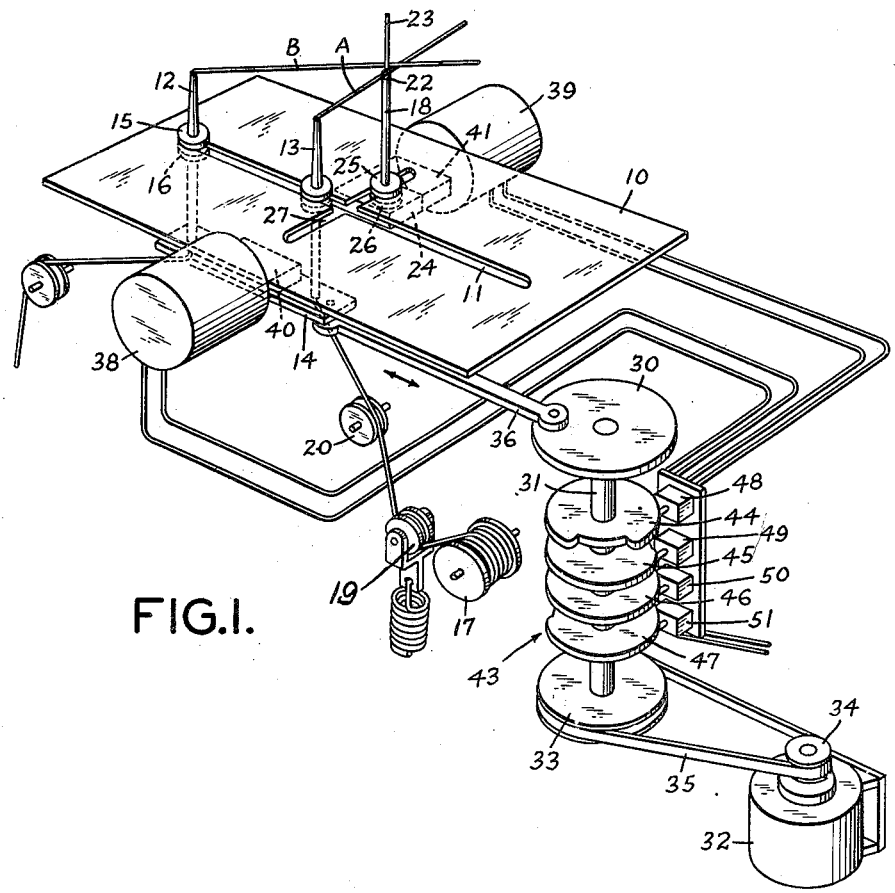
Fig. 1 is a perspective and schematic view of a typical coiling machine embodying the present invention.

As shown in Fig. 1, the machine may include a table 10 which is formed preferably of some non-magnetic material such as aluminum or the like and is supported on a cabinet base or legs as may be desired. The table 10 has a longitudinally extending slot 11 therein in which are guided a pair of hollow yarn guides 12 and 13 which are connected together at their bottom by means of a plate 14 to cause them to move simultaneously. The yarn or filament guides 12 and 13 are provided with upper and lower flanges 15 and 16 which bear against the top and bottom of the plate 10 and allow the yarn guides to slide freely back and forth along the slot 11. The yarn guides 12 and 13 are hollow tubular members and each of them receives from a suitable supply reed 17 a filament A or B which is to be coiled around the mandrel 18. The filament A may pass from the reel 17 beneath a tensioning pulley 19, over an idler pulley 20 and then into the bottom of the tube 13 to be drawn out of the top thereof and wrapped around the mandrel 18. The filament B is fed similarly to the guide tube 12.

The mandrel 18 is a tapered metal rod having a conical tip 22 from which extends a rod or wire 23 of small diameter which is sufficiently stiff to maintain itself in an upright position. The mandrel 18 is mounted on a block 24 which is positioned below the table 10 and the mandrel also has guide flanges 25 and 26 thereon to guide it for reciprocation in the transverse slot 27 in the table 10. The block 24 may be formed of magnetic material such as iron or it may actually be a magnet having opposite north and south poles for a purpose to be described.

The yarn or filament guides 12 and 13 are reciprocated back and forth along the slot 11 and the mandrel 18 is likewise reciprocated back and forth along the slot 27 in timed relation to produce a relative orbital movement between these elements suitable for winding the filaments A, B around the mandrel rod 23 to form two complemental coils. The mechanism for producing the movement includes a crank or crank disc 30 on the upper end of a drive shaft 31 which is rotated by means of an electric motor 32 or the like through the medium of the pulleys 33 and 34 and the belt 35. The crank disc 30 is connected by means of a crank 36 to one end of the connector plate 14 on which the filament guides 12 and 13 are mounted. Thus, when the motor 32 is operated, reciprocating movement is imparted to the guides 12 and 13 along the slot 11.

At the same time, a reciprocating movement is imparted to the mandrel 18 along the slot 27 by electrical means in the embodiment shown in the drawing. Mounted on opposite sides of the table 10 and adjacent opposite ends of the slot 27 are the electro magnets 38 and 39. The electro magnets have their pole pieces or cores 40 and 41 in alignment with the bar 24 on which the mandrel is mounted. The electro magnets are energized by means of a multiple contact switch 43 in which the cams 44, 45, 46 and 47 are mounted on the shaft 31 and turn with the crank disc 30. The cams 44 to 47 cooperate with switches 48, 49, 50 and 51 to alternately energize the electro magnets 38 and 39 or to reverse their polarity to drive the block or magnet 24 back and forth along the slot 27 in timed relation to the movement of the yarn guides 12 and 13.

It will be understood that while the mechanism for driving the mandrel is illustrated as being electro magnetically operated, it can be operated by a mechanical crank system similar to that for reciprocating the filament guides 12 and 13 or by pneumatic, hydraulic or other equivalent drive mechanisms.

The timing of the movement of the yarn guides 12 and 13 and the mandrel 18 is of greatest importance in the operation of the device for the reason that the proper orbital movement must be provided between these elements while they actually move in straight lines at angles to each other. The schematic disclosures shown in Figs. 2 to 10 and 2a to 10a illustrate the operation of the device and the sequence of movements of the elements thereof in order to produce two complemental coils from the two filaments A and B.

Figure 2:
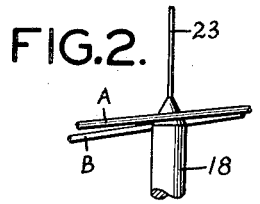
Figs. 2 to 10 are diagrammatic views illustrating the operation of the machine in coiling two filaments or strands around the mandrel of the device.
Figure 3:
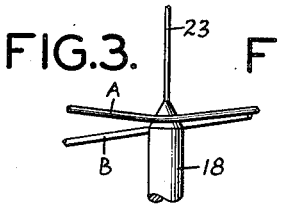
Figure 3A:
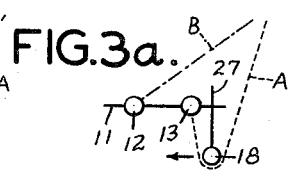

It will be assumed that the right hand ends of the filaments A and B shown in Fig. 2 are retained against movement as by wrapping them tightly around the rod 23 and gripping them at their upper ends with some means for drawing them up the mandrel as the coils are formed. Such a withdrawing means is disclosed in the Wahl U. S. Patent No. 2,300,442, dated November 3, 1942. As shown in Fig. 2, the yarns will be essentially parallel and will be laid so that they extend on opposite sides of the mandrel 18. The position of the mandrel 18 with respect to the yarn guides 12 and 13 at the beginning of the coiling operation will be assumed to be that shown in Fig. 2a in which the yarn guides 12 and 13 are at the left-hand end of the slot 11 and the mandrel is at the upper end of the slot 27. The first motion of the apparatus from the position shown in Figs. 2 and 2a will be for the mandrel 18 to move to the lower end of the slot 27 so that the filament A will now be bent into a generally U-form around the mandrel while the filament B still remains straight as indicated in Figs. 3 and 3a.

Figure 4:
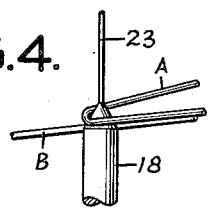
Figure 2A:
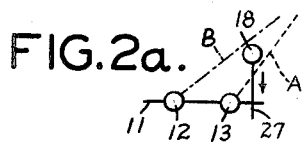
Figure 4A:
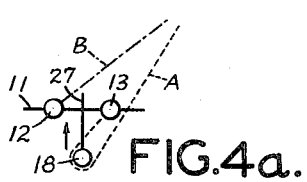

The next motion in the sequence of operation is illustrated in Figs. 4 and 4a in which the two filament guides 12 and 13 have moved along the slot to the right so that they are positioned on opposite sides of the slot 27 with the mandrel 18 in the lower position. As shown in Figs. 4 and also 4a, the yarn B is still essentially straight while the filament A is now bent almost 180°.

Figure 5:
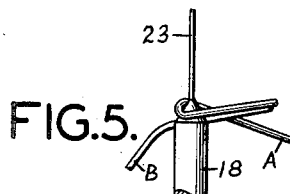
Figure 5A:
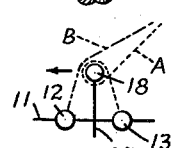

The next motion of the machine is to move the mandrel 18 to the upper end of the slot 27 as shown in Figs. 5 and 5a. As a result of the movement of the mandrel 18 it will be clear that the filament A has now been formed into almost a complete loop while the filament B has now been bent slightly.

Figure 6:
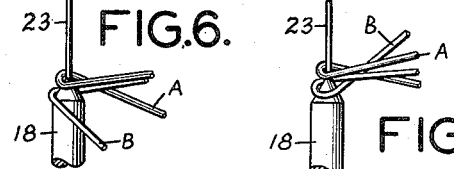
Figure 7:
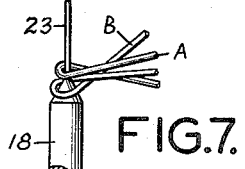
Figure 6A:
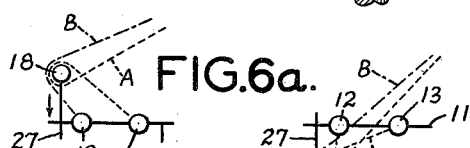
Figure 7A:
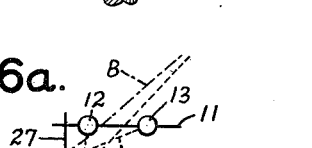
Figure 8:
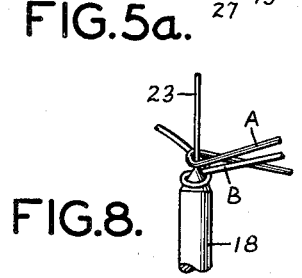
Figure 9:
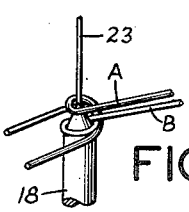
Figure 8A:
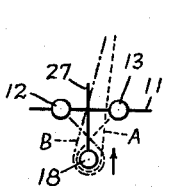
Figures 9A, 10A:
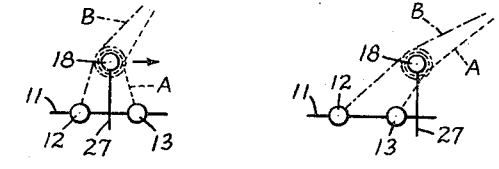
Figure 10:
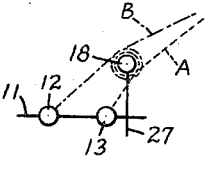

The carriage with the yarn guides 12 and 13 then moves to the right-hand end of the slot 11 with the mandrel 18 in the uppermost position as shown in Figs. 6 and 6a. In this position, the condition of the filament A remains essentially unchanged while the filament B has now been bent nearly 180°. With the yarn guides at the right-hand end of the slot the mandrel 18 then moves down along the slot 27 to the lower end thereof as shown in Figs. 7 and 7a. As a result, the yarn B is bent into a practically complete loop while the yarn A is also in almost a complete loop formation. The yarn guides 12 and 13 then start their movement to the left as shown in Figs. 8 and 8a until they are on opposite sides of the slot 27 with the mandrel at the bottom end of the slot 27. This motion completes substantially the formation of the loop in the filament B while leaving the loop in the filament A substantially unchanged. The mandrel 18 then moves to the upper end of the slot 17 as shown in Figs. 9 and 9a with the result that the filament B is given an additional approximately half-turn and forms a full 360° loop.

Continued movement of the yarn guides 12 and 13 to their initial position with the mandrel 18 in the upper position completes the formation of loops in both filaments A and B with the loops overlapping and interwound.

Repetition of the motions described above will result in the formation of additional loops in each of the filaments. As each complete cycle is finished, the loops will be formed successively on the conical tip of the mandrel and the coils will be tightened and will gradually be forced up the rod 23 and removed at the top thereof. The coils formed thereby can be suitably treated to make them form-retaining and then may be separated or may be joined to form slide fasteners or the like.

Of course, coils may be formed for other purposes and the machine may be modified to produce other articles than coils as indicated previously. For example, the machine may be used for winding cables in which there is a center coil element. The center coil element may be fed up through the center of a hollow mandrel like the mandrel 18 and forms the rod 23 of the mandrel. The central cable or core can be withdrawn with the coils formed around it to produce a continuous multi-piece coil member. Similarly, in a manner recognized in the art, the device may be modified to have three or more yarns fed to the mandrel to accomplish mating of the yarns or multiple coiling operations as may be required.

Inasmuch as the apparatus is susceptible to considerable amount of variation in the structure and arrangement of the filaments, guides and the mandrel and in the mechanism for causing the reciprocating movements of the yarn or filament guides and the mandrel, the form of the invention described herein should be considered as illustrative and not as limiting the scope of the following claims.

I claim:

1. An apparatus for coiling and mating filaments and the like comprising at least two guides for filaments, means for supplying filaments to said guides, means supporting said guides for movement along a substantially straight path, a mandrel around which said filaments are to be coiled, means supporting said mandrel for movement back and forth across said path, and means for moving said guides and said mandrel along said paths to provide a relative figure eight motion between said guides and said mandrel to wind said filaments around the mandrel in overlapping coils.

2. An apparatus for coiling and mating filaments and the like comprising a support, a pair of spaced apart filament guides extending outwardly from said support in substantially parallel relation, means for moving said guides simultaneously back and forth along said support in a substantially straight path, a mandrel projecting out from said support, means for moving said mandrel in timed relation to said guides to cross the path of said guides, and means to supply filaments to said filament guides for winding around said mandrel.

3. The apparatus set forth in claim 2 in which said means for moving said mandrel in timed relation to said guides moves said mandrel across the path of said guides in front of, between and behind said guides.

4. An apparatus for coiling and mating filaments and the like comprising a platform, a pair of substantially parallel guides for filaments extending outwardly from said platform, means supporting said guides for movement along said platform in substantially a straight line, a mandrel on said platform and extending outwardly therefrom in the same direction as said guides, means supporting said mandrel for movement along said platform in a path intersecting said line, means for moving said guides back and forth along said line, and means for moving said mandrel back and forth along its path to produce a relatively substantial figure eight movement between said guides and mandrel.

5. The apparatus set forth in claim 4 in which the means moving said guides back and forth comprises a motor-driven crank.

6. An apparatus for coiling and mating filaments and the like comprising an elongated mandrel, means supporting said mandrel for movement back and forth in a direction substantially perpendicular to its axis, a pair of guides for filaments substantially parallel with said mandrel, means supporting said guides for movement along a path intersected by the movement of said mandrel, means to supply filament to said guides and means for moving said guides and mandrel relatively to describe substantially figure eight motions therebetween.

7. The apparatus set forth in claim 6 in which the means for moving said guides and mandrel comprise, a motor driven crank and alternately energized electromagnets, respectively.

8. The apparatus set forth in claim 6 comprising a thin rod extending from said mandrel around which said filaments are coiled.

9. The apparatus set forth in claim 6 comprising a platform, a first track on said platform for guiding said guides in a substantially straight path, and a second track on said platform intersecting said first track at about the center of the path of movement of said guides.

10. The apparatus set forth in claim 6 comprising a platform, a first track on said platform for guiding said guides in a substantially straight path, a second track on said platform intersecting said first track at about the center of the path of movement of said guides, and in which said means for moving said guides and mandrel comprise a motor driven crank connected to said guides, and electromagnets adjacent opposite ends of said second track for alternately attracting said mandrel.

11. An apparatus for coiling and mating filaments and the like comprising a support, at least two guides for filaments, means for supplying filaments to said guides, a mandrel around which said filaments are to be wound, means mounting said guides on said support for movement relative thereto, means connecting said guides to maintain them in substantially uniformly spaced relation, means mounting said mandrel on said support for movement along a path intersecting the movement of said guides, and means for moving said guides and mandrel in timed relation to describe a relative figure eight motion between said guides and said mandrel and wind said filaments around the mandrel in mating coils.

References Cited in the file of this patent

UNITED STATES PATENTS

| | | |
|---|---|---|
| 622,406 | Warner | Apr. 4, 1899 |
| 2,343,348 | Wahl | Mar. 7, 1944 |
| 2,541,728 | Wahl | Feb. 13, 1951 |
| 2,541,729 | Wahl | Feb. 13, 1951 |
| 2,705,027 | Sanborn | Mar. 29, 1955 |

FOREIGN PATENTS

| | | |
|---|---|---|
| 126,328 | Australia | Dec. 16, 1947 |